United States Patent [19]

Corso et al.

[11] Patent Number: 4,769,446
[45] Date of Patent: Sep. 6, 1988

[54] FIBER-REACTIVE RED AZO DYESTUFF

[75] Inventors: Anthony J. Corso, Coventry, R.I.; Fritz Meininger, Frankfurt am Main, Fed. Rep. of Germany; Thomas S. Phillips, East Greenwich, R.I.

[73] Assignee: Hoechst Celanese Corporation, Somerville, N.J.

[21] Appl. No.: 485,682

[22] Filed: Apr. 18, 1983

[51] Int. Cl.$^4$ .................. C09B 62/51; D06P 1/38; D06P 3/10; D06P 3/66
[52] U.S. Cl. ........................... 534/642; 8/549; 534/887; 534/727; 534/736
[58] Field of Search ............... 260/195, 194; 534/642; 8/549

[56] References Cited

U.S. PATENT DOCUMENTS

| | | | |
|---|---|---|---|
| 3,419,542 | 12/1968 | Meininger et al. | 260/195 |
| 4,045,428 | 8/1977 | Meininger et al. | 260/195 X |
| 4,046,754 | 9/1977 | Meininger et al. | 260/162 |
| 4,139,527 | 2/1979 | Meininger et al. | 260/195 X |

*Primary Examiner*—Floyd D. Higel
*Attorney, Agent, or Firm*—Hugh C. Crall

[57] ABSTRACT

A water-soluble fiber-reactive red dyestuff is disclosed which, in its free acid form, has the formula

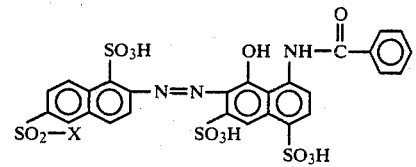

wherein X is —CH=CH$_2$ or —CH$_2$CH$_2$—Z wherein Z is —OH, —Cl, —Br, —OSO$_3$H, —SSO$_3$H, —OPO$_3$H$_2$, —O$_2$CCH$_3$, —O$_2$CCH$_2$CH$_3$ or —N(lower alkyl)$_2$. Liquid compositions of said dyestuff are also disclosed. This dyestuff yields brilliant red shades on cellulosic materials having excellent fastness properties and superior color yield and build up.

8 Claims, No Drawings

FIBER-REACTIVE RED AZO DYESTUFF

BACKGROUND OF THE INVENTION

The present invention provides a new water-soluble, fiber-reactive monoazo dyestuff, and liquid compositions thereof.

In U.S. Pat. No. 4,046,754 (Meininger et al) the disclosure of which is incorporated herein by reference, there is disclosed in Example 7 a reactive dyestuff of the formula

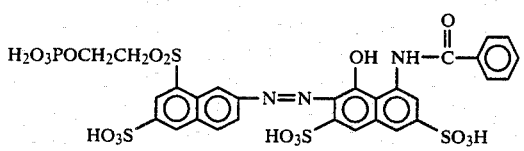

which is said to provide bluish red dyeings having good fastness to light and to washing.

SUMMARY OF THE INVENTION

Applicants have discovered a new, water-soluble fiber-reactive dyestuff of the formula

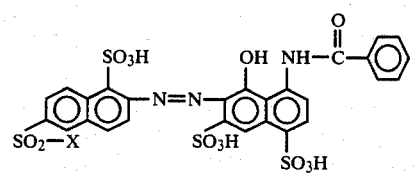

wherein X is $-CH=CH_2$ or $-CH_2CH_2-Z$ wherein Z is $-OH$, $-Cl$, $-Br$, $-OSO_3H$, $-SSO_3H$, $-OPO_3H_2$, $-O_2CCH_3$, $-O_2CCH_2CH_3$ or $-N(\text{lower alkyl})_2$, and water-soluble salts thereof. Liquid compositions containing 5 to 45% of said dyestuff in water are also provided.

DESCRIPTION

The dyestuff of the present invention may be prepared in the conventional manner by coupling 1-benzoylamino-8-naphthol-4,6-disulfonic acid (benzoyl K-Acid) with diazotized 2-amino-6-β-hydroxyethylsulfonyl-naphthalene-1-sulfonic acid, or the sulfuric acid, thiosulfuric acid, acetic acid or phosphoric acid monoester thereof. The corresponding haloethylsulfone, vinyl sulfone, or N,N-diloweralkylaminoethylsulfone derivatives of the diazo component may also be utilized when those moieties are desired in the final product. Lower alkyl means alkyl of 1 to 4 carbon atoms.

After preparation, the dyestuff may be isolated as a powder, either by salting it out of solution or by spray drying, and brought to standard strength by the addition of inorganic salt, generally sodium sulfate. Advantageously, the prepared dyestuff may be used directly as a liquid composition after standardizing with water. Such liquid compositions will contain from 5 to 45% (by weight) of the water soluble dyestuff of the present invention, preferably 10 to 20%, and water. Said liquid composition may also optionally contain from 0 to 10%, preferably 0 to 6%, of inert inorganic salt, typically the alkali metal (lithium, sodium, potassium) and ammonium chlorides and sulfates and mixtures thereof. While said liquid composition may also optionally contain up to 5% of buffer substances, it is preferred that the composition remain substantially free of such materials. It is also preferred that liquid compositions of the dyestuff having the hydroxyethylsulfone monoester moiety be maintained at a pH of from about 2.5 to about 4.5 for maximum stability.

The dyestuff of the present invention is suitable for the dyeing of cellulosic materials such as cotton, linen, viscose rayon or staple fibers. It can be applied by any one of the usual dyeing and printing methods for reactive dyestuffs and yields on cellulosic materials, in the presence of alkaline agents, brilliant red shades having excellent fastness properties, and particularly superior color yield and build up (ratio of dyestuff concentration to color intensity), as well as reduced cold water bleeding. The present dyestuffs may also be used on wool, silk or polyamide fibers.

The invention may be further illustrated by the following Example in which the parts and percentages are by weight.

EXAMPLE

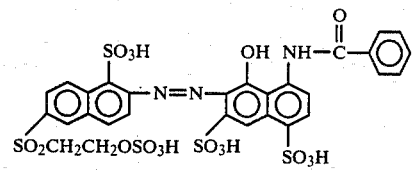

62.8 parts of 2-aminonapthalene-6-β-hydroxethylsulfone (100%) were converted to the sulfuric acid ester by dissolving in 162 parts of 100% sulfuric acid and then sulfonated by the addition of 78 parts of 65% oleum. The product was isolated by drowning in ice water (250 parts of water, 500 parts of ice, 62.5 parts of sodium chloride), filtering and washing the presscake with 250 parts of cold 20% sodium chloride solution. The presscake was reslurried in 450 parts of water, 100 parts of ice and diazotized with 34.5 parts of 40% sodium nitrite solution. The excess nitrite was decomposed by the addition of one part of sulfamic acid and then 540 parts of a 16% solution of 1-benzoylamino-8-napthol-4,6-disulfonic acid were added in the form of the lithium salt. The pH of the reaction was then adjusted to 5.0–5.5 with 65 parts of a 15% solution of sodium carbonate and the resulting solution was spray dried to yield 275 parts of dyestuff, containing 5.8% inorganic sulfate salts and 7.6% inorganic chloride salts. This was then blended with 68.7 parts of anhydrous sodium sulfate to yield 343.7 parts of standard strength dyestuff powder. Alternatively, the dyestuff solution before spray drying could have been standardized as a liquid dyestuff solution by the addition of water and adjusting the pH to 2.5–4.5 to yield 1375 parts of standardized liquid dyestuff.

What is claimed is:

1. A water-soluble fiber-reactive dyestuff of the formula

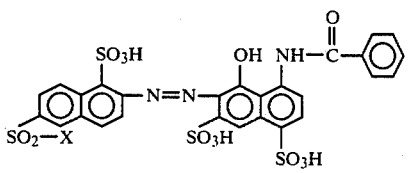

wherein X is —CH=CH₂ or —CH₂CH₂—Z wherein Z is —OH, —Cl, —Br, —OSO₃H, —SSO₃H, —OPO₃H₂, —O₂CCH₃, —O₂CCH₂CH₃ or —N(lower alkyl)₂, or water soluble salts thereof.

2. A dyestuff according to claim 1, which in its free acid form, has the formula

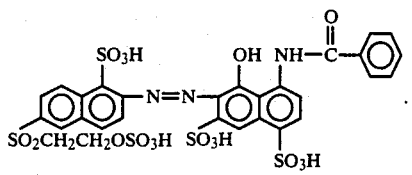

3. A liquid dyestuff composition comprising 5 to 45% of a water-soluble dyestuff according to claim 1 and water.

4. A liquid dyestuff composition comprising 5 to 45% of a water-soluble dyestuff accoding to claim 2 and water.

5. A liquid dyestuff composition according to claim 4 which additionally comprises from 0 to 6% inert inorganic salt.

6. A liquid dyestuff composition according to claim 5 wherein said inert inorganic salt is selected from the alkali metal and ammonium chlorides and sulfates and mixtures thereof.

7. A liquid dyestuff composition according to claim 6 which comprises from 10 to 20% of said water-soluble dyestuff.

8. A liquid dyestuff composition according to claim 7 which is maintained at a pH of from about 2.5 to about 4.5.

* * * * *